B. W. RHODES.
TOBACCO TRUCK.
APPLICATION FILED MAY 15, 1918.

1,357,117. Patented Oct. 26, 1920.

Inventor
Benjamin W. Rhodes,
By
Attorney

UNITED STATES PATENT OFFICE.

BENJAMIN W. RHODES, OF EAGLE ROCK, NORTH CAROLINA.

TOBACCO-TRUCK.

1,357,117.  Specification of Letters Patent.  Patented Oct. 26, 1920.

Application filed May 15, 1918. Serial No. 234,617.

*To all whom it may concern:*

Be it known that I, BENJAMIN W. RHODES, a citizen of the United States, residing at Eagle Rock, in the county of Wake and State of North Carolina, have invented new and useful Improvements in Tobacco-Trucks, of which the following is a specification.

The invention is designed for the particular purpose of providing a unique and convenient device for harvesting tobacco, including a truck on which the gathered tobacco may be carried, rollers and skids or runners on which the truck is carried, the purpose of the peculiar construction being to govern the movement of the truck by having either the rollers or the runners engage the ground. If the truck is being moved up hill provision is made for moving it solely on the rollers. If moving down hill the runners engage the ground, thereby effecting a braking operation on the device and a retardation of too free movement.

The invention is further designed to provide a device of this character which is simple in construction, durable and effective in operation and inexpensive to manufacture.

To the exact construction in which it is shown and described, the invention is not to be restricted. The right is reserved to make any changes or alterations suggested by the demands of practice, in so far as such changes or alterations are compatible with the spirit of the annexed claim.

Figure 1:
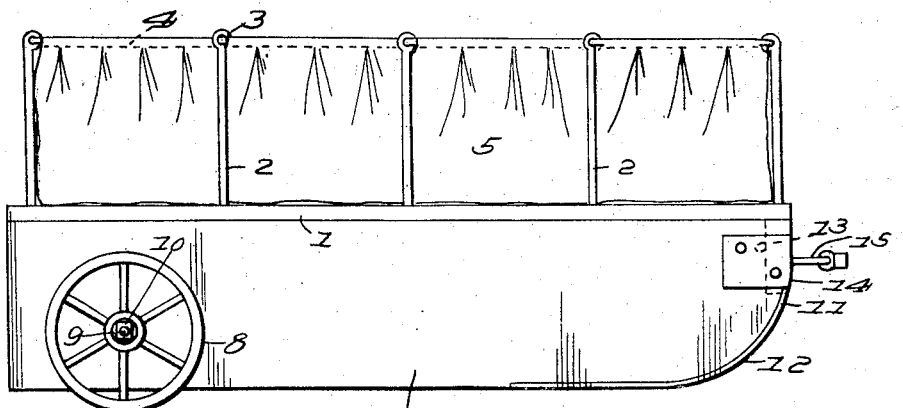
Figure 1 is a side elevational view.
Figure 2:
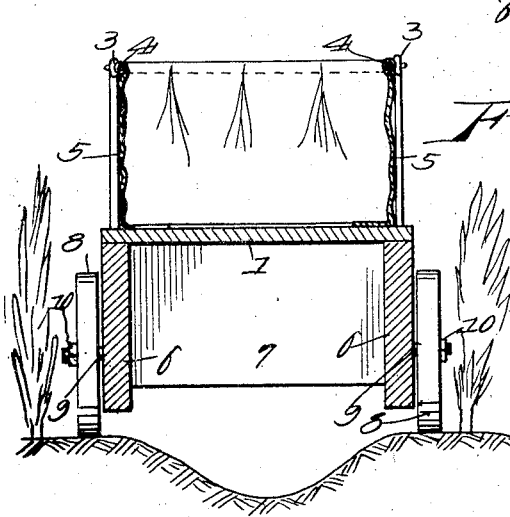
Fig. 2 is a section on the line 2—2 of Fig. 1.

As shown, the invention comprises a truck having the platform 1 upstanding at the marginal edges of which there are the stanchions 2 each formed with an eye 3 at its upper end. Through the eyes of the several stanchions there is trained a cable 4 which serves as a means for supporting the upper end of an apron 5, the latter having its lower marginal edges lying on top of the platform 1, so that any dirt or other particles dropped off of the harvested tobacco plants may be confined to the platform and not distributed onto the ground. The device, it is intended, shall support the harvested tobacco plants in the usual way as such harvested plants are supported, namely, on appropriate sticks or poles with the heads or leaves down. As the plants are gathered, the sticks on which they are carried are positioned transversely across the cable 4 on the two sides of the device, so that the leaves may hang down toward the platform between the two sides of the apron.

The platform 1 is mounted upon two longitudinal runners 6 extending the full length of the platform and these two runners are interconnected by a transverse plate 7 at the rear end. Adjacent this rear end, there is mounted on each runner a wheel 8 rotatably mounted on a trunnion 9, the latter being provided on its free end with a detachable nut 10 by means of which the wheel is secured on the trunnion. The wheel is so mounted that a portion of its periphery is exposed below the lower or free edge of the runner, so that the wheel may engage the ground to provide for free movement of the device when no part of the runner engages the ground.

At the forward end of the device, the runners are cut off to provide the inclined edges 11 to permit them to freely pass over any obstructions that the device may encounter in use and, further than being provided with these inclined edges, the runners are each provided with a shoe or wear plate 12 suitably fixed on the bottom edge of the runner and extending around partly onto the inclined edge 11.

A transverse plate 13 connects the two runners at their forward ends and supports the platform 1 therebetween at the forward end of the latter and this plate 13 is covered by a wear plate 14 which extends around onto the sides of the runners at their forward ends and is attached to both them and to the plate 13 in any suitable manner. A clevis 15 is carried by the plate 13 and provides means by which the device may be drawn by a draft animal.

In the use of the device, it is intended that it shall be drawn between adjacent rows of standing tobacco plants, the wheels and the shoes resting upon the hill at either side of the furrow. The plants are gathered and placed in the usual manner, as previously described, across the cable 4. In the event that the rows frim which the plants are being gathered is on an incline, and the movement of the device down the incline, the draft animal will be ahead and will, therefore, be moving on a lower level than will the device. Therefore, when the animal is called upon to move the device and a pull is exerted on the clevis 15, this pull will tend to keep the shoes in contact with the ground thereby providing resistance against too free movement of the device down the incline.

Figure 3:
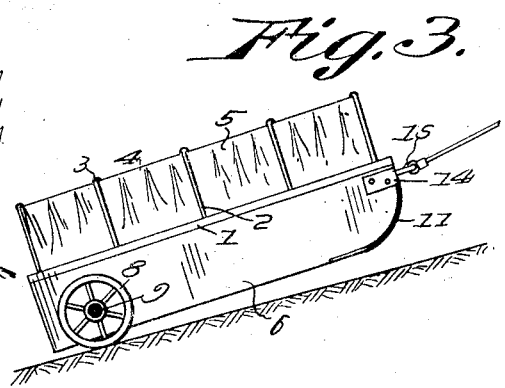
Fig. 3 is a side elevational view showing the position of the device ascending an incline.
Figure 4:
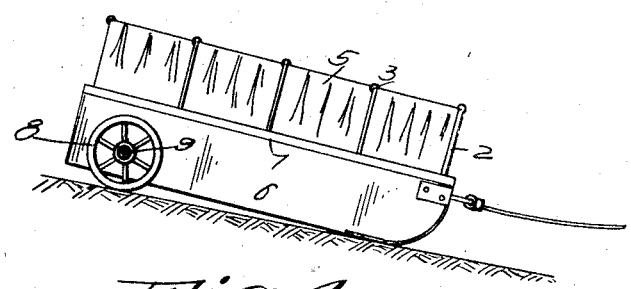
Fig. 4 is another side elevational view but showing the position assumed by the device when descending an incline.

On the other hand if the device is moving up an incline, the draft animal will be higher than the device and as it attempts to pull the device up the hill, the tendency will be to raise the shoes off the ground thereby decreasing the frictional resistance provided by the shoes and allowing the wheels solely to act in such movement. Figs. 3 and 4 definitely illustrate this feature of the invention.

From the foregoing description and the accompanying drawings, it is believed that a clear enough understanding of the invention will be had to render further description unnecessary.

What is claimed is:

A tobacco truck comprising a platform having means for supporting tobacco plants thereabove, longitudinal runners depending from the platform and extending the full length thereof, the said runners at their forward ends having curved edges, a wheel rotatably mounted on each runner near its rear end, a shoe carried by each runner and embracing the forward curved edge, the shoe extending partly onto the under edge of the runner, and a clevis carried at the forward end of the truck, whereby both the wheels and shoes engage the ground when the truck is on a level or being drawn down an incline and the wheels alone engage the ground when the truck is drawn up an incline.

In testimony whereof I affix my signature.

BENJAMIN W. RHODES.